Patented July 3, 1928.

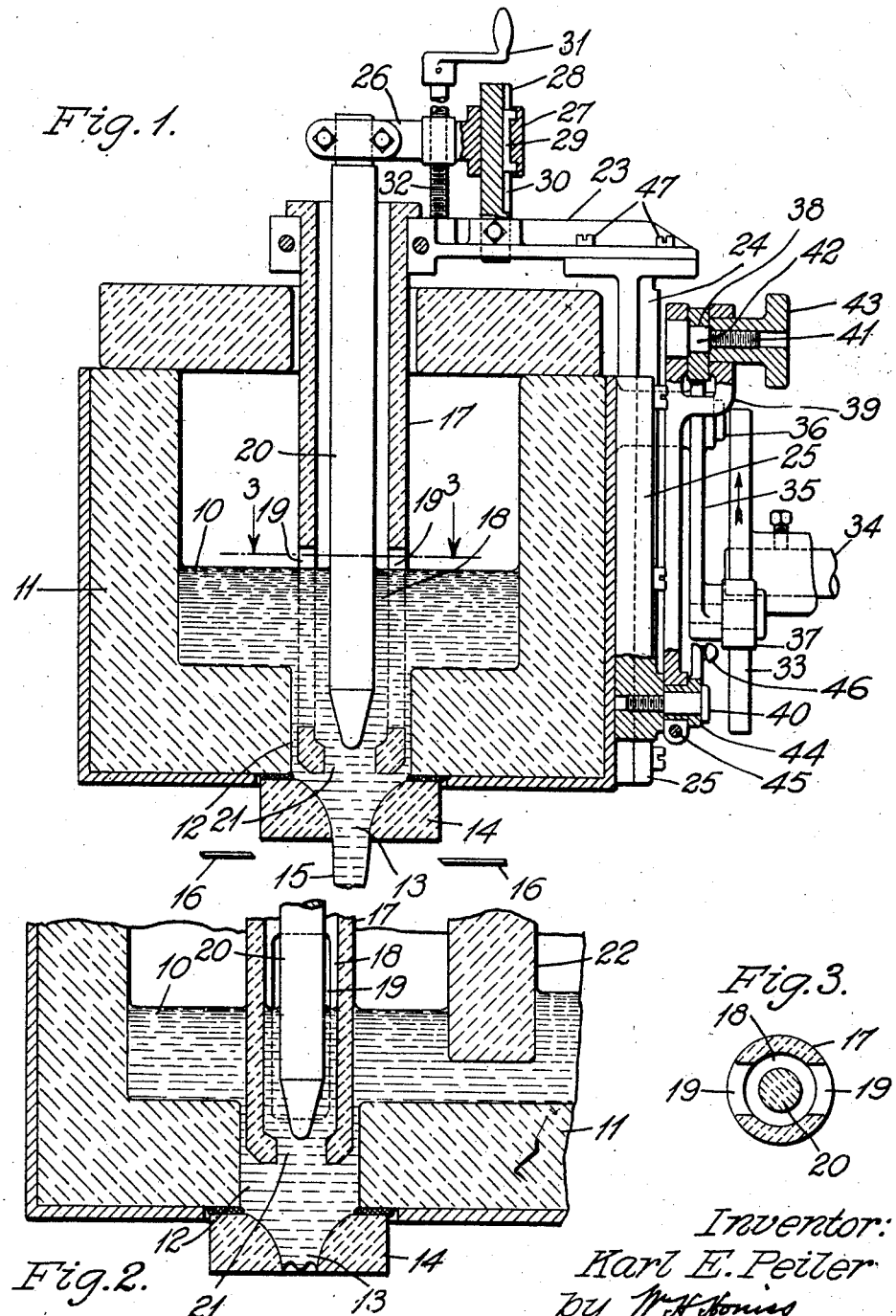

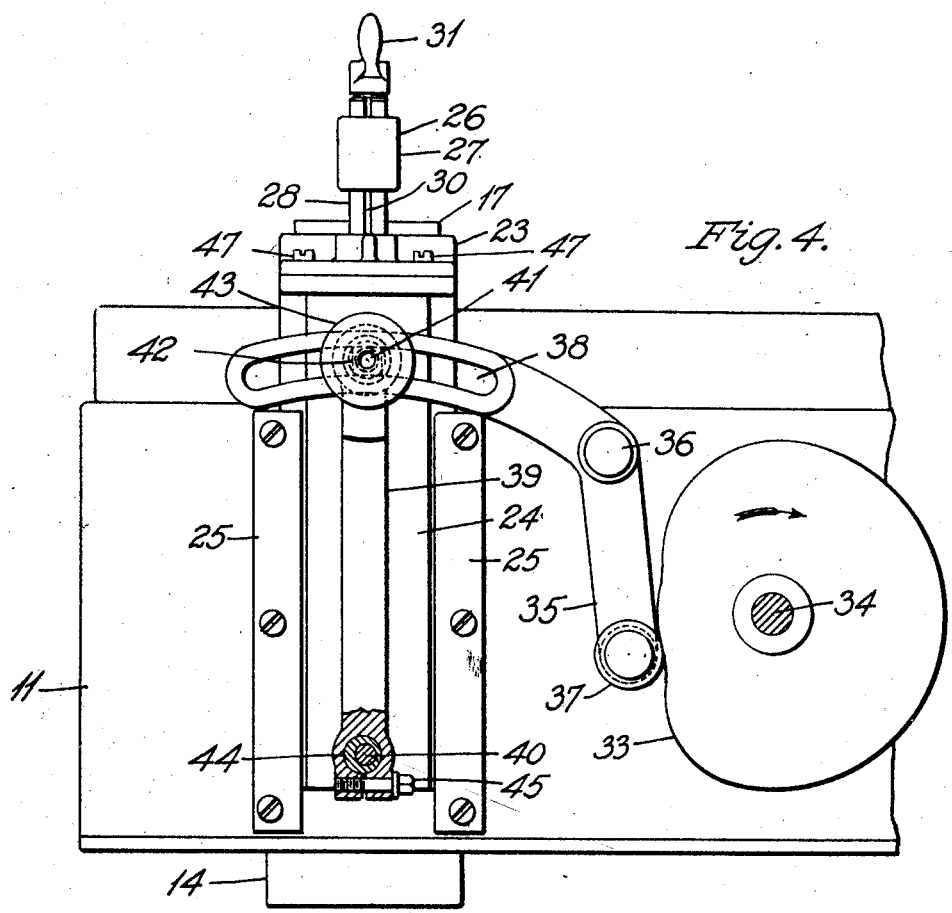

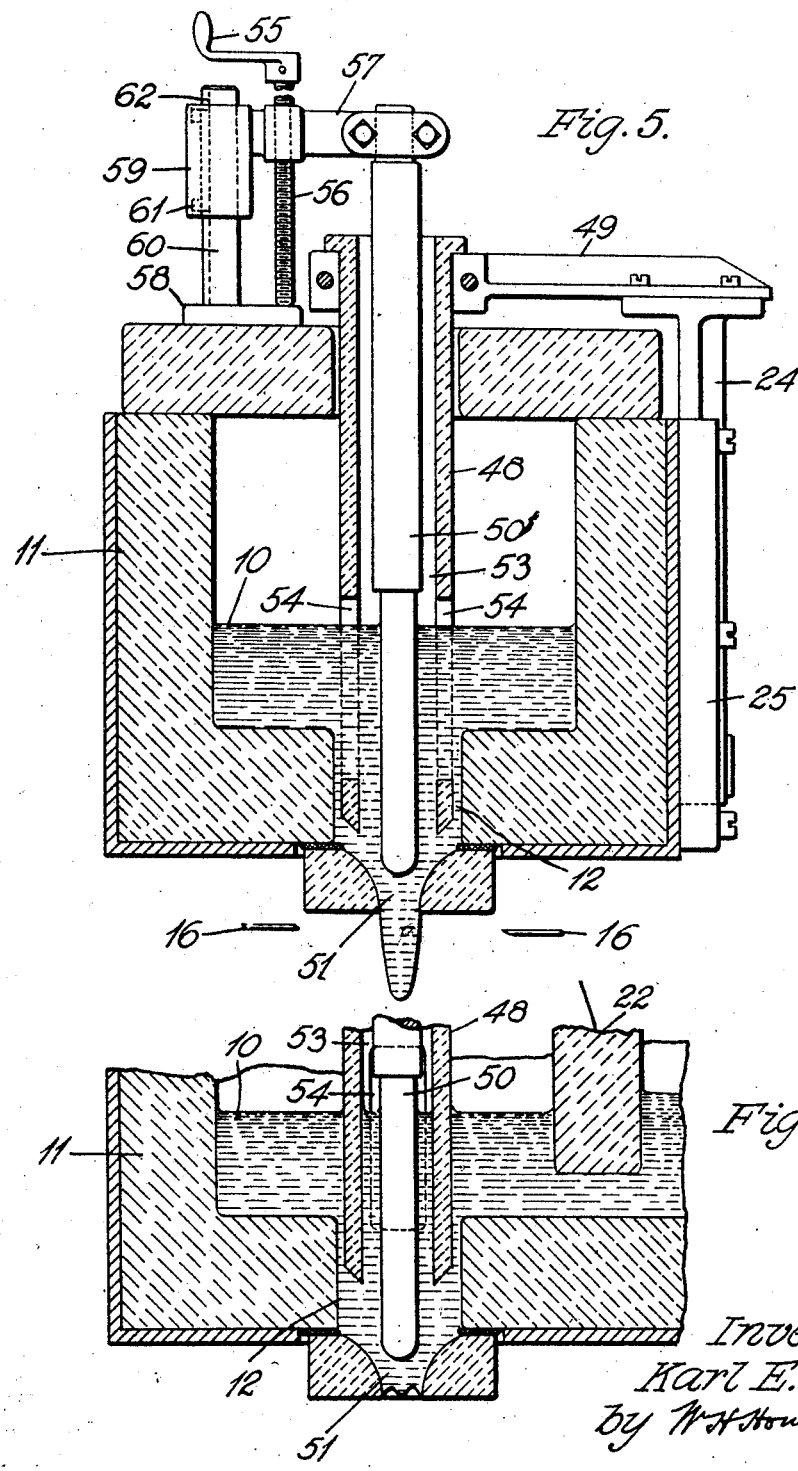

1,675,819

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

APPARATUS FOR FEEDING MOLTEN GLASS.

Application filed January 27, 1923. Serial No. 615,308.

This invention relates to apparatus for separating molten glass into mold charges, its object being to feed the glass in successive suspended masses of any predetermined size and shape for delivery to the molds of glass shaping machines, so as to adapt the feeding apparatus to produce mold charges of a size and shape best suited for the production of any of the numerous sizes and shapes of commercial glassware.

By the present method the molten glass is flowed or fed from the forehearth of a furnace or other receptacle through the interior of a reciprocating hollow plunger having adjustable means for throttling or regulating the resistance to the flow of glass therethrough or through the outlet over which the plunger operates. The resistance regulating means may be given any desired shape and size and may move with the plunger or be held stationary. It is preferably in the form of a valve, which in one case is adapted to throttle the plunger outlet, and in another case it is adapted to throttle the container outlet. In each of these cases it may be adjusted so as to increase or diminish the resistance to the flow of glass to or through the discharge outlet, or to discontinue such resistance altogether.

The glass flowing into the plunger is sequestered in an annular column formation therein, over and in alignment with the outlet, the top of the column being surrounded by and fed directly from the interior of the main body of glass, which thus forms a heated environment around the column, besides serving as a replenishing source for the top of the column. The effect of the column movements, either forwardly or backwardly is assisted by adhesive contact of its surfaces with the interior surrounding wall of the moving plunger, which is of advantage in controlling the movement of the glass at the outlet.

Other features of the invention will appear from the description to follow.

In the drawings:

Figure 1 is a sectional elevation of a machine embodying the invention, with the hollow plunger shown at about its lowermost position;

Fig. 2 is a fragmentary sectional elevation with the plunger shown at about its uppermost position;

Fig. 3 is a sectional plan on line 3—3 of Fig. 2;

Fig. 4 is a side elevation looking at the right of Fig. 1, showing the plunger operating mechanism;

Fig. 5 is a sectional elevation of a modified form of the invention, with the hollow plunger shown at about its lowermost position; and Fig. 6 is a fragmentary sectional elevation with the plunger at about its uppermost position.

The supply of molten glass 10 may flow from a furnace or melting tank of any well known type to the container 11, which may form a forehearth to the furnace. The container is provided with a well 12 terminating in a submerged outlet 13 formed in the removable ring 14. The size of the outlet is adapted to the size of the charges to be made, one of the charges being indicated at 15 ready for severance by the shear blades 16 which may be of any known construction, and adjustable to sever at any desired height and in desired time relation to the plunger movements.

Projecting into the outlet well 12 is a hollow plunger 17, preferably adapted to fit the well as closely as practical, consistent with satisfactory operation of the plunger. The intention is to flow all or the greater portion of the glass forming the mold charges through the plunger. Therefore, the glass in the well outside of the plunger serves merely or mainly as a packing between the plunger and wall of the well to enable the plunger to operate as a piston therein.

Communicating with the passage 18 of the plunger are one or more inlet openings 19 through the plunger wall, of the required flow capacity, which remain constantly open for the inflow of glass to the submerged outlet 13. These inlets extend both above and below the top of the well, thus allowing a free inflow of glass to the plunger at all positions thereof.

The size of the internal flow passage 18 of the plunger may conveniently be regulated by the insertion therein of different size flow regulating members 20, adjustable to both vary the resistance to flow in the passage and to act as a valve for regulating the size of the discharge opening 21, which is preferably made about equal to the size of the outlet 13. If the regulating member is raised to a point where it no longer throttles the outlet 21, it is still capable of adjustment to different points above the outlet and can thereby be made to offer different degrees of resistance to the flow of glass in the plunger, and hence continues to act as a flow resistance regulating member independently of its function as a valve.

By adjusting the regulating member to throttle the outlet 21, various retractive and extrusive effects may be produced at the outlet, depending upon the results desired in the formation of the suspended gathers.

If desired, the throttling of the outlet 21 may be used to vary the weight of the mold charges, but it is preferable to use this throttling only for shape control and to use other means for weight control.

The hollow plunger may be operated in conjunction either with a fixed or an adjustable head of glass, because adjusting the head is a convenient way of regulating the weight of the charges. This head may be regulated by any suitable means, such as the gate 22, which may be adjusted by any suitable means, not shown.

As the plunger rises it tends to create a void in the well beneath it, which void may be satisfied by the inflow of the glass flowing downwardly through the plunger, or by the glass retarded or retracted in the outlet, or by a combination of both, according to the character and especially the speed of the plunger movements. When the plunger is given a rapid upward movement, the retarding or retractive effect through the outlet will be greater than if the plunger is moved slowly.

The downward or extrusion impulses of the plunger are also utilized to control the shape of the mold charge, both at its upper end and through its body while it is passing through and accumulating beneath the outlet. Stronger downward impulses increase the diameter of the portions of the gather then being extruded. Thus the movements of the plunger may be adapted to produce the desired shape of the mold charges, the plunger being reciprocated periodically at the times, and to the extent required for assisting, retarding, and, if desired, reversing the gravitational flow of glass through the outlet, any or all of which influences may be utilized to control and vary the shape of the suspended gathers or mold charges to the desired extent.

The desired changes in the shapes of the charges may also be effected by proportioning the discharge passages of the container and internal flow plunger, or by varying the character of the movements of the plunger, or the time and amplitude of its stroke, or by varying its working range within the well or submerged outlet, these variations being determined by the contour of the cam for operating the plunger, different shaped cams being employed to produce different results.

The severing mechanism will be timed to correspond to the formation of the charges, the remaining stub from which the charge is severed being preferably retracted into the outlet by the upward movement of the plunger, the retraction beginning either before, after, or during severing as desired, depending upon the shape of charge desired.

The plunger tube 17 is adjustably clamped upon an arm 23, removably connected with a reciprocally mounted bracket 24 guided by ways 25 on the container 11.

The regulating member 20 is suitably clamped upon an arm 26, having a bearing portion 27 mounted to slide upon a post 28 extending upwardly from the arm 23. The arm 26 is adapted to hold the member 20 properly centered within the plunger. Rotation of the arm 26 upon the post 28 is prevented by a key 29 inserted in a splineway 30 formed in the post, the key being preferably extended longitudinally through the bearing 27 and having projections at its ends extending into notches formed in the ends of the bearing. Adjustment of the regulating member 20 longitudinally of the plunger is effected by turning the handle 31 of a feed screw 32 threaded through the arm 26 and extending into engagement with the plunger carrying arm 23.

Reciprocation of the plunger 17 and the parts supporting it is effected by an adjustable cam 33 on a suitably driven shaft 34 through connections, comprising a lever 35 mounted on a fixed stud 36 and having a roll 37 engaging the cam 33. The horizontal arm of the lever is slotted at 38 and adjustably connected with a link 39 pivotally connected at 40 to the plunger carrying bracket 24. The connection between the link 39 and lever 35 is adjustable and comprises a stud 41 having a square central portion 42 slidable in the slot 38 of the lever and also a threaded portion carrying a hand wheel 43 by which the stud may be clamped upon the lever. The link 39 is forked to receive the slotted arm of the lever, one side of the fork being pivoted upon the head of the stud 41 and the other upon the hub of the hand wheel 43. This construction permits the connection between the link and lever to be adjusted toward or from the pivot 36 of the lever while the machine is in operation, thus varying the effective leverage of the lever and thereby varying the length of the stroke of the plunger. The length of the stroke of the plunger may be varied without changing its lowest position, by making the slot 38 in the form of an arc having its center at 40 when the plunger is at its lowermost position.

In order to effect adjustment of the plunger 17 relative to the outlet, so that its range of vertical movement within the well may be slightly varied, the pivot pin 40 of the link 24 is provided with an eccentric bushing 44 rotatable upon the pivot pin. The bushing extends through the lower end of the link, the latter being split and clamped upon the bushing by tightening the clamp screw 45. The bushing is provided with a handle 46 by which it may be rotated to effect the desired adjustment of the plunger longitudinally within the well.

The cam 33 is removably mounted upon the shaft 34 in order that it may be readily replaced by other cams for varying the plunger movements to regulate the discharge of the glass, the contour of each cam being adapted to afford the particular results desired in the operation of the machine from time to time.

Where it is desired to feed mold charges to two or more shaping machines producing articles of different shapes or sizes, or both, the plunger operating cam may be provided with the desired number of lobes of the proper contours, so that for each revolution of the cam shaft a series of mold charges of the required shapes and sizes will be produced.

The arm 23 and the plunger and other parts carried thereon may be readily detached from the bracket 24 as a unit, by unscrewing the bolts 47 connecting the arm with the bracket.

In the modification shown in Figs. 5 and 6, the plunger 48 on the arm 49 is operated in the same manner and preferably by the same means as the plunger 17, but the regulating member 50, instead of moving with the plunger, is made stationary and constitutes a flow resistance regulating member at all positions of adjustment. If the regulating member 50 is adjusted in the higher positions, where it is mostly within the hollow plunger, it acts mainly to regulate the resistance to flow through the plunger passages and thus varies the retractive and extrusive effects due to the movements of the plunger, thereby controlling the shape of the charges. If, however, the regulating member is adjusted to throttle the discharge outlet it will regulate the quantity of glass discharge from the outlet in addition to affording increased resistance to flow through the passage leading to the outlet. The position of the regulating member will depend upon the results desired in the shape or weight control of the suspended gathers.

The plunger 48 fits relatively close in the well 12, the same as the plunger 17 and for the same purpose, and the central passage 53 of the plunger is provided with inlet openings 54 corresponding to the openings 19 in the plunger shown in Fig. 1.

Adjustment of the regulating member 50 relative to the outlet 51 is effected by turning the handle 55 of a feed screw 56 threaded through the arm 57, the lower end of the screw engaging a plate 58 on the top of the container 11.

The arm 57 is adjustably clamped upon the member 50 and is provided with a bearing 59 arranged to slide upon the post 60 extending upwardly from the plate 58. A key 61 extends through the bearing and projects into the splineway 62 of the post to prevent the arm 57 from turning, whereby the member 50 is maintained in proper alignment, centrally of the plunger 48.

Reciprocation of the plunger 48 and the bracket 24 supporting it will be effected by the cam mechanism shown in Fig. 4 and adjustment of the plunger relative to the outlet can also be effected by changing the position of the eccentric bushing 44 shown in Fig. 4.

The illustrated embodiment of the invention may be modified in construction, arrangement, and mode of operation by those skilled in the art, without departing from the scope of the invention as defined in the appended claims.

Certain features disclosed but not claimed in the present application, form a part of the subject matter of copending applications of the present inventor, Serial No. 605,681, filed December 8, 1922, and Serial No. 543,571, filed March 14, 1922.

The claims of this application are directed to features generic to the forms of apparatus embodying the invention as illustrated in Figs. 1 to 4 inclusive, and 5 and 6 of the drawings of the application, or to features specific to the form of apparatus shown in Figs. 5 and 6 of the drawings. Claims directed particularly to features specific to the form of apparatus shown in Figs. 1 to 4 inclusive of the drawings of the present application are not included herein, but are made in my copending divisional application, Serial No. 168,952, filed Feb. 17, 1927.

I claim:

1. In apparatus for segregating mold charges from a body of molten glass, the combination with a glass container provided with a discharge outlet, of a plunger operable within the container and having an internal flow passage for the glass to the outlet, a flow resistance regulating member adjustable in said passage relative to said discharge outlet, and means for actuating said plunger to periodically accelerate and retard the flow of glass at the outlet.

2. In apparatus for segregating mold charges from a body of molten glass, the combination with a glass container provided with a well terminating in a discharge outlet, of a plunger projecting into the well and provided with an internal flow passage communicating with the glass above its discharge end at all positions of the plunger, means for varying the resistance to the flow of glass in said passage, and means for reciprocating the plunger within the well.

3. In apparatus for segregating mold charges from a body of molten glass, the combination with a glass container provided with a well terminating in a discharge outlet, of a plunger projecting into the well and having a constantly open passage for the flow of glass to the outlet, a flow regulating member located within the passage and adjustable relative to the outlet, means for reciprocating the plunger in the well, and means for varying the hydrostatic head of glass in the container.

4. In apparatus for segregating mold charges from a body of molten glass, the combination with a glass container provided with a submerged outlet, of a plunger operable within the container relative to the outlet and having a constantly open internal flow passage for the glass to the outlet, means adjustable to vary the resistance to the flow of glass in said passage, means for reciprocating the plunger to accelerate or retard the discharge from the outlet, and means for severing mold charges from the glass discharged through the outlet.

5. In apparatus for segregating mold charges from a body of molten glass, the combination with a glass container having a discharge outlet, of a plunger movable in the glass relative to the outlet and having an internal flow passage communicating with the glass above its discharge end at all positions of the plunger, means for regulating the resistance to flow in said passage, and means for actuating the plunger to periodically accelerate or retard the gravitational flow to the outlet.

6. In apparatus for segregating mold charges from a body of molten glass, the combination with a glass container provided with a discharge outlet, of a movable member provided with a flow passage communicating at its upper end with the body of glass and at its lower end with the outlet, means for regulating the resistance to flow in said passage, and means for moving said member to periodically raise and lower its contained glass to modify the gravity flow therethrough.

7. In apparatus for segregating mold charges from a body of molten glass, the combination with a glass container provided with a discharge outlet, of a plunger operable within the container relative to the outlet and having an internal flow passage for the glass to the outlet, means for varying the resistance to the flow of glass in said passage, and a cam controlled operating mechanism for the plunger, including means for adjusting the limits of its movements.

8. A glass feeder comprising in combination a container for molten glass having an outlet opening through which the glass issues, a regulating plunger, means to reciprocate the plunger toward and from the outlet, and a stationary core controlling the size of the outlet.

9. A glass feeder comprising in combination a container for molten glass having an outlet opening through which the glass issues, a hollow regulating plunger, means to reciprocate the plunger toward and from the outlet, and a stationary core within the plunger.

10. A glass feeder comprising in combination a container for molten glass having an outlet opening through which the glass issues, a hollow regulating plunger, means to reciprocate the plunger toward and from the outlet, and a stationary core extending through the plunger and protruding beyond the plunger into the outlet.

11. In a glass feeder, the combination of a container for molten glass having an outlet opening in its bottom, a core projecting downward into the glass over the outlet, means for adjusting the core up and down, the walls of the core and outlet being shaped to cause a variation in the effective area of the outlet by said adjustment of the core, a mechanical regulator surrounding the core, and automatic means to periodically move the regulator toward and from the outlet.

12. A glass feeder comprising in combination, a container for molten glass having an outlet through which the glass issues, a hollow plunger projecting into the outlet and provided with a passageway between the interior of the plunger and the molten glass in the container above the outlet, a flow regulating core within the plunger and extending into the outlet, and means for adjusting the vertical position of the core.

13. A glass feeder comprising in combination, a container for molten glass having an outlet through which the glass issues, a tubular plunger projecting into the outlet and having a lateral passageway connecting the inside of the plunger and the glass in the container, means to reciprocate the plunger while its lower end remains within the outlet, a stationary core within the plunger and projecting from both ends thereof, and means engaging the upper end of the core for adjusting it vertically.

14. In apparatus for segregating mold charges from a body of molten glass, the combination with a glass container having a well terminating in a discharge outlet, a tubular member projecting into the glass in the well, a solid member within said tubular member, and means for reciprocating said tubular member toward and from the outlet.

15. In apparatus for segregating mold charges from a body of molten glass, the combination with a glass container provided with a well terminating in a discharge outlet, of a periodically reciprocating hollow plunger fitting the well closely enough to prevent appreciable discharge of glass past the outside of the plunger and adapted to permit flow of glass internally thereof to the outlet, means for reciprocating the plunger, and means for regulating the resistance to flow through the plunger.

16. In apparatus for segregating mold charges from a body of molten glass, the combination with a glass container provided with a well terminating in a discharge outlet, of a periodically reciprocating internal flow plunger fitting the well closely enough to prevent appreciable discharge of glass past the outside of the plunger, and having its lower end constantly within the well, means for reciprocating the plunger, and means for regulating the resistance to flow through the plunger.

Signed at Hartford, Connecticut, this 25th day of January, 1923.

KARL E. PEILER.